April 15, 1941. J. Z. DENINSON 2,238,629
METHOD FOR STEREOSCOPIC SCANNING OF PICTURES
Filed April 24, 1937 2 Sheets-Sheet 1
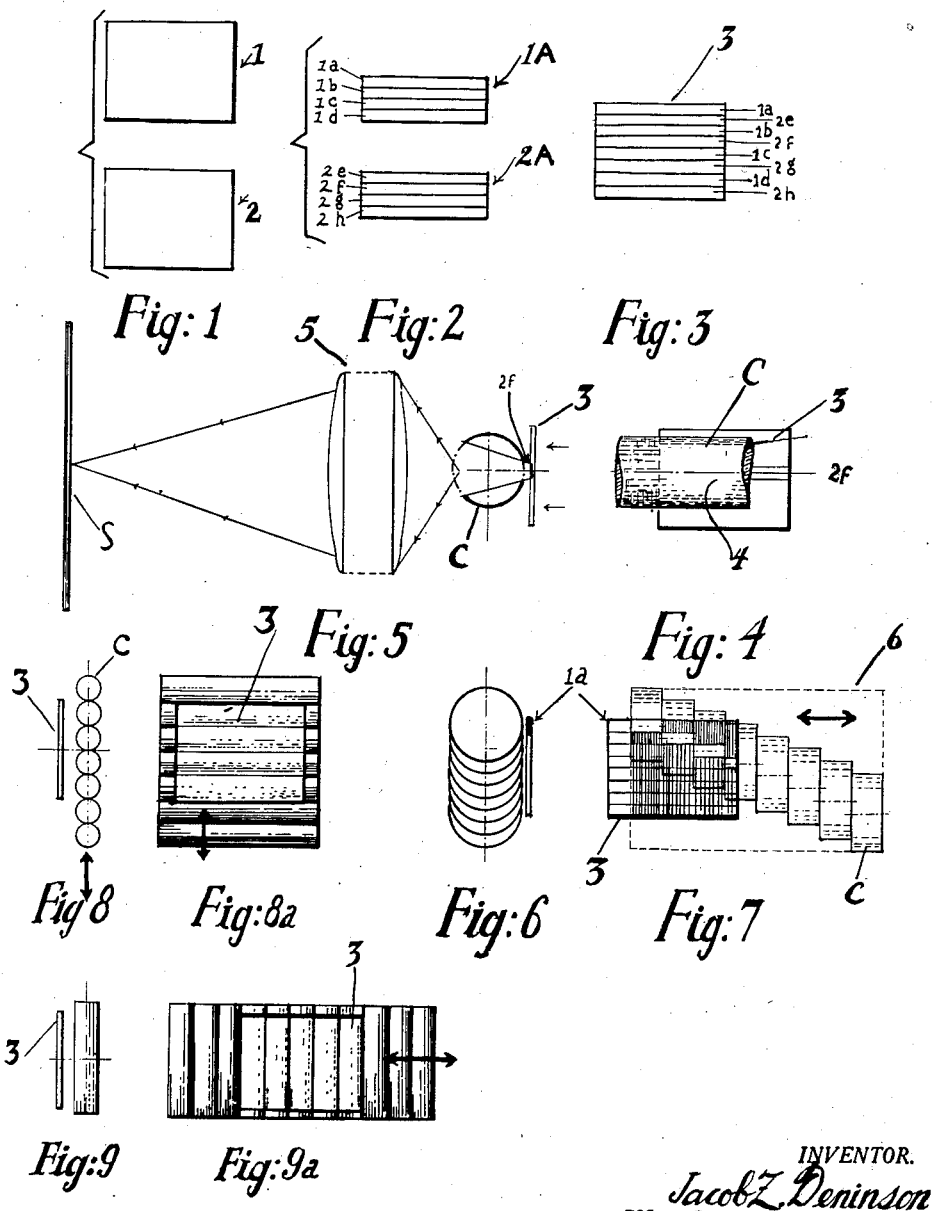

April 15, 1941.  J. Z. DENINSON  2,238,629
METHOD FOR STEREOSCOPIC SCANNING OF PICTURES
Filed April 24, 1937  2 Sheets-Sheet 2
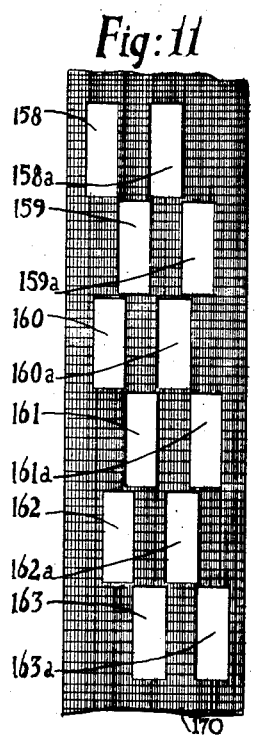
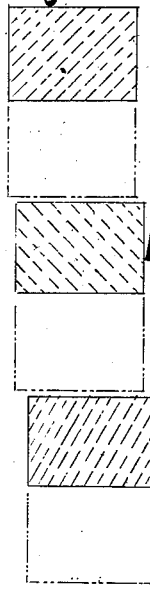
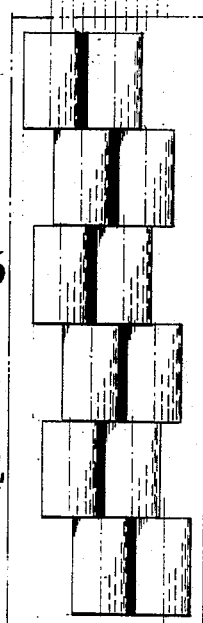
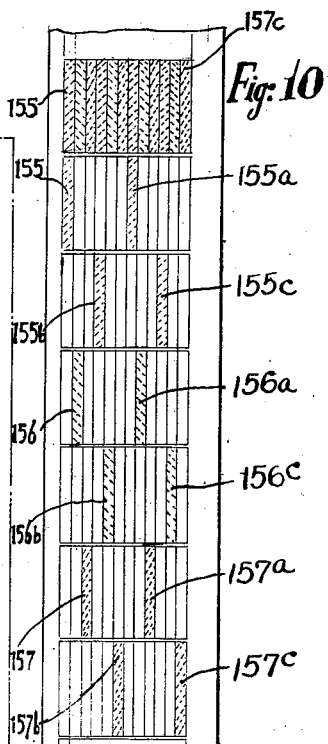
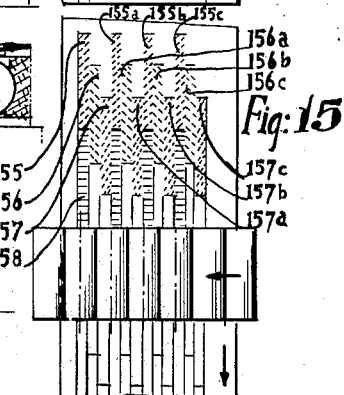
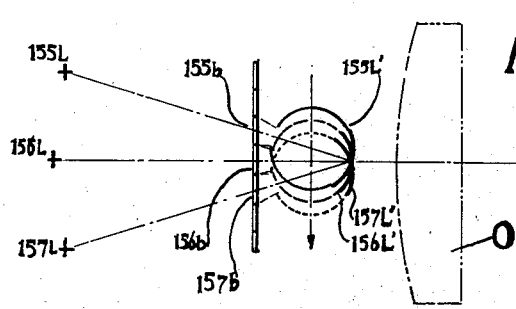
INVENTOR.
Jacob Z. Deninson
BY Mock & Blum
ATTORNEYS.

Patented Apr. 15, 1941

2,238,629

UNITED STATES PATENT OFFICE 2,238,629

METHOD FOR STEREOSCOPIC SCANNING OF PICTURES

Jacob Z. Deninson, New York, N. Y.

Application April 24, 1937, Serial No. 138,767

2 Claims. (Cl. 88—16.6)

My invention relates to a new and improved device for producing stereoscopic projection from special transparencies or special film. The invention also relates to a method of securing monostereoscopic projection from film which has been specially prepared.

Another object of my invention is to utilize a series of prisms, or cylinders, or other corresponding optical members, between which and the diapositive or film there is relative movement, while the diapositive or film is being projected upon a suitable screen.

Another object of my invention is to provide a method whereby motion picture film can be fed intermittently through a projector in the usual manner, and while each frame of the film is being maintained stationary for a fraction of a second, the light which passes to the objective lens system, is caused to pass through a series of suitable optical members which are preferably of the refracting type.

A relative movement is produced between the frame and said optical members, preferably by moving the optical members at suitable speed relative to the frame, while said frame is maintained stationary.

Another object of my invention is to utilize optical members or optical means, either of the refracting type or reflecting type, whereby the light which is projected upon the screen is divided into a series of sections of varying brightness, although the optical parts may be adjusted so as to give the effect of substantially uniform illumination over the entire screen. By causing a relative movement between the optical members or the optical means, and the frame or picture which is being viewed, and while projecting said frame or picture upon the screen, the effect of monostereoscopic vision is secured.

Another object of my invention is to utilize the properties of cylinders, prisms, or other equivalent optical means or optical elements.

While I prefer to locate the battery of cylinders or other refracting elements, between the source of light and the transparency which is being projected, I have also shown, in other embodiments of my invention, the location of the cylinders or other refracting means, between the transparency and the projecting-lens system. In such case I may use prisms and two projecting-lens systems, in order to produce a single image upon the screen of each line element, although I do not limit myself to the use of prisms or a plurality of projecting lens systems.

While my invention relates to the projection of a transparency or film, it also relates to the use of the same optical principles, in taking motion pictures or other pictures, although, as previously stated, I prefer to take the pictures or motion pictures by means of a conventional camera, and without using the cylinders or similar accessory optical means.

There are numerous other objects of my invention, which will be stated further in the following description and drawings, which illustrate certain preferred embodiments thereof, in diagrammatic form.

Fig. 1 is a plan view, illustrating two frames which are separate pictures of the same object in the same position, taken by the two lenses of a stereoscopic camera. One of said frames has been taken through one lens, and the other frame through the other lens. Each of these frames corresponds in size to the conventional gate which may be used in the ordinary motion-picture projection apparatus. For example each of these frames may have a width of one inch and a height of ¾ of an inch. Of course these frames respectively correspond to left-eye and to right-eye images of the same object in the same position.

Fig. 2 represents the respective frames of Fig. 1, showing how each frame has been reduced along a single dimension, namely, the height of the frame. In this embodiment, the width of the frame has been maintained constant and the height of the film has been reduced to one-half of its original height. Fig. 2 also shows how each reduced frame can be assumed as having been divided optically into any desired number of lateral zones or lateral sections, four sections being shown in this embodiment, merely for convenience of illustration. In actual practice the number of lateral sections would be much greater. It is to be understood that whenever any specific figures or proportions are referred to, this is only by way of example, and is not a limitation.

Fig. 3 shows the type of film which may be used in the actual projection machine. This film consists of successive lateral sections, and each pair of consecutive lateral sections corresponds to corresponding lateral sections of the respective reduced frames shown in Fig. 2.

Fig. 4 is a diagrammatic view illustrating how one of the lateral sections 2f shown in Fig. 3 is magnified, if a cylinder 4 is placed in front of said section 2f, and the strip 2f is viewed through said cylinder.

Fig. 5 is a side elevation illustrating the projection of a part of a frame, through a cylinder and through a projecting lens system. This figure also illustrates the entire frame which is utilized, and which has the full size of one of the frames illustrated in Fig. 1.

Fig. 6 is a side-view of Fig. 7.

Fig. 7 shows an assembled series of cylinders, in each of which the diameter of the circular end face of the cylinder is much greater than the length of the cylinder, as measured in a direction parallel to the longitudinal axis of the cylinder. Fig. 7 also includes a double headed arrow, in order to indicate that the battery of cylinders is moved in a direction parallel to the longitudinal axes of said cylinders, since the axes of all the cylinders are parallel to each other. Fig. 7 also shows the frame 3. Fig. 7 also indicates that the cylinders are assembled so that their central points are along a straight line which is inclined to the axes.

Fig. 8 is a side elevation showing a different embodiment of the invention. This illustrates a battery of cylinders which are suitably connected to each other, and which are arranged with their axes horizontal and superposed and in the same vertical plane. In this embodiment the length of each cylinder is much greater than the diameter of the end wall of the cylinder.

Fig. 8a is a front elevation of Fig. 8.

The double headed arrows in Fig. 8 and Fig. 8a indicate the line along which the cylinders are reciprocated.

Fig. 9 is similar to Fig. 8, save that in Fig. 9, the cylinders are reciprocated in a direction parallel to the long or horizontal edge of the frame, whereas in Fig. 8, the cylinders are reciprocated vertically and perpendicular to the long edge of the frame.

Fig. 9a is a front elevation of Fig. 9.

Figure 10 is an elevation of the frame of a motion picture film which is projected by intermittent movement in a direction parallel to its length and shows series of zones or sub-pictures.

Figure 11 is an elevation of a mask which is used for forming the zones shown in Figure 10.

Figure 12 is an elevation of one of a first pair of stereoscopic negatives. This is aligned horizontally with slots 158 and 158a of the mask shown in Figure 11 and with zones 155 and 155a of Figure 10 to show that said slots are used to produce said zones. This figure also shows the negative aligned with slots 159 and 159a of the mask.

Figure 13 is an elevation of the second of said first pair of stereoscopic negatives shown horizontally aligned with slots 160 and 160a and with Figure 10 to show that said slots are used to produce the zones of Figure 10.

Figure 14 is an elevation of a stereoscopic negative of the second pair, shown aligned horizontally with slots 162 and 162a and with Figure 10 to show said slots are used to form some of the zones of Figure 10. This figure also shows the negative of Figure 13 aligned horizontally with slots 163 and 163a of Figure 11 and with Figure 10 to show that said slots are used to form the zones shown in Figure 10.

Figure 15 is an elevation showing a film which is projected by continuous longitudinal movement, and the cylinders in the date. The arrow shows that the cylinders are reciprocated in a horizontal line.

Figure 16 illustrates how the zones are printed on the frame of Figures 10 and 15.

Figure 17 shows diagrammatically the scanning and projection system.

Figure 18 is an elevation of the battery of cylinders which is used with the mask of Figure 11.

Referring to Fig. 1, this shows a pair of frames designated by the reference numerals 1 and 2. These frames are stereoscopic views of the same object, the frame 1, for example, corresponding to a left-eye view and the frame 2 corresponding to a right-eye view. Said frames 1 and 2 can be taken in consecutive order or simultaneously, by means of a stereoscopic camera of the usual type.

Fig. 2 shows how the frames 1 and 2 have been reduced in height, and without reducing their width. The frame 1A corresponds to the reduced frame 1, and the frame 2A corresponds to the reduced frame 2.

Fig. 2 also shows how the reduced frame 1A has been divided into a suitable series of imaginary optical sections 1a, 1b, 1c, and 1d, and how the reduced frame 2A has been divided into the same number of imaginary optical sections 2e, 2f, 2g, and 2h.

Fig. 3 shows a composite frame which has been made by assembling in alternate order, the optical sections of the frames 1A and 2A. For example, the top section of the frame illustrated in Fig. 3 is the top section 1a of the frame 1A. The next section of the composite frame is the top section 2e of the frame 2A. By assembling these sections of the left-eye frame and of the right-eye frame, a composite frame can be made, said frame consisting of sections which are respectively left-eye and right-eye sections.

The manufacture of a composite frame, of the type illustrated in Fig. 3, can be made by means of well known optical means, which therefore require no further description.

I have described an improved and satisfactory means for producing such a composite frame, later herein.

Fig. 4 shows the film or frame 3, which has been illustrated in Fig. 3, with the optical section 2f of said frame 3 properly aligned with the optical axis of a cylinder C.

The optical axis of the cylinder C is parallel to the axis of the optical segment 2f, and said optical axis is located centrally between the top edge and the bottom edge of the frame section 2f. Fig. 4 also shows the light area 4, which illustrates the magnification of the height of the optical section 2f. As is well known, a cylinder magnifies only one dimension of the object which is viewed through the cylinder or which is projected by means of the cylinder and therefore Fig. 4 illustrates how the frame section 2f has been magnified only along one of its dimensions, namely, its height.

Fig. 5 illustrates how light is projected by means of any suitable device upon the film 3, and how the light which passes through the optical section 2f is caused to pass through the cylinder C, so as to form an image, which may be real or virtual. The real image may be formed within the cylinder C, although the invention is not to be restricted to this. Fig. 5 also illustrates a conventional objective or projecting lens system 5, by means of which an enlarged image of the section 2f is projected upon the screen S.

In this embodiment the cylinder C magnifies the section 2f, so as to compensate for the reduction in height of the original frame 2. In other words, assuming that the frame 1A is one-half the height of the frame 1, and the frame 2A is one-half the height of the frame 2, the cylinder C, in such case, would magnify the height of the frame segment 2f, to twice the height of said frame segment. The magnified image of the frame segment 2f is then projected in the usual manner.

It will be noted that the cylinder C will project the frame section 2f, only when the optical axis of the cylinder C is located substantially intermediate the top edge and the bottom edge of said frame section 2f. Therefore, if the cylinder C is moved up and down rapidly, while the film or frame 3 is held stationary, the movement of the cylinder C will cause the successive projections of the various sections 1a to 2h. The diameter of the end faces of the cylinder C is greater and may be much greater than the height of a frame section. Therefore, and as previously explained, the relative movement between the cylinder C and the sections of the composite monostereoscopic frame 3, would cause said frame sections to be projected one by one upon the screen. By employing a battery or assembly of cylinders, as later described herein, alternate frame sections of the type illustrated in Fig. 3 are projected upon the screen, while the intermediate sections are not projected. Hence a sufficiently rapid movement of the cylinder C will give the effect of monostereoscopic vision, by reason of the alternate projection of series of alternate sections of the frame.

Figs. 6 and 7 illustrate the assembly of a plurality of cylinders C. Each of these cylinders C has an axial length, which is less than the diameter of the end face of said cylinder. These cylinders C are arranged in echelon, as illustrated in Fig. 7. Fig. 7 indicates, in broken lines, a rectangle 8, in order to indicate the general dimensions and the arrangement of the assembly of cylinders C. Fig. 7 also shows the frame 3, in proper relative relation to the assembly or battery of cylinders C. Fig. 7 also illustrates, by means of the double-headed arrow, how the cylinders are moved parallel to their axes. In Fig. 7, the optical sections of the frame 3 are located horizontally, in the same manner illustrated in Fig. 3. Fig. 7 therefore illustrates how the battery of cylinders C, when they are reciprocated, rapidly scan the optical segments, so that at any given time, only a part of each optical segment is being projected. When the projection of one optical segment has been terminated, a part of the succeeding optical section is still being scanned or projected.

As previously noted, each cylinder projects only the frame section which is aligned with the thickest part of the cylinder.

The top left-hand cylinder in Fig. 7, projects only the adjacent part of the top frame-section. The next cylinder only projects the frame-section below the top frame section, etc. The cylinders can be located and reciprocated so that a part of each frame-section is always being projected. Whenever the cylinders are used to project frame-sections, an objective lens can be utilized for the final projection.

Figs. 8 and 8a illustrate the frame 3, and a battery of cylinders C, which are arranged in superposed relation, so that the horizontal axes of the cylinders are in the same vertical plane. For the purposes of these figures, it is assumed that the film of which the frame 3 forms a part, is intermittently fed in a downward vertical direction. As shown by the double-headed arrows in Fig. 8 and in Fig. 8a, the battery of cylinders is reciprocated with suitable rapidity in a vertical up and down direction. The same optical effect previously mentioned is secured, because the frame is projected at any given interval only in sections, each section corresponding to that part of the frame which is substantially aligned with the optical axis of one of the cylinders C. It will be noted that the cylinders shown in Fig. 7 and in Fig. 8 can be used with an ordinary motion picture film taken by means of the conventional camera and in the conventional manner.

Figs. 9 and 9a are based on the same principle as Figs. 8 and 8a. In Figs. 9 and 9a, and as shown by the double headed arrow of Fig. 9a, the battery of cylinders which is shown in Fig. 8 is arranged with their axes vertical, and said battery of cylinders is reciprocated with sufficient rapidity, in a horizontal direction.

This method can be used with ordinary motion picture film or with a film having the special type of composite stereoscopic frame which has previously been disclosed. However, if the method illustrated in Figs. 9 and 9a is utilized in connection with a film having frames of the type of the frame 3, the optical sections of such frame would then be held vertically, instead of being held horizontally as shown in Fig. 3. Likewise, in utilizing a frame with the method shown in Figs. 9 and 9a, the width of the frames 1 and 2 would be reduced, leaving their height unchanged.

The optical principles disclosed herein, make it possible to produce a motion picture positive film, which can be fed continuously through a projector, instead of using the intermittent feeding and the shutter, which are now conventional. It is highly desirable to be able to feed the positive film continuously through the projector, since greater illumination can be secured, there is less wear on the film, and the quality of the projection is improved.

The general principle is illustrated in connection with Figs. 10–17.

Fig. 11 shows a mask having slots which are arranged in lateral rows. The slots of the respective lateral rows are offset relative to the slots of the preceding row and of the succeeding row.

For example, let it be assumed that it is desired to make a monostereoscopic film from pairs of stereoscopic negatives. One pair of stereoscopic negatives is shown in Figs. 12 and 13 and a stereoscopic negative of the next pair is shown in Fig. 14. It can be assumed that the first stereoscopic negative shown in Fig. 12 has the top part of the mask shown in Fig. 11 applied thereto, so that the slots 158 and 158a of said mask expose two separated vertical zones of the first stereoscopic negative. Each of the slots 158 and 158a has an area which is equal to one-fourth the area of the stereoscopic negative of Fig. 12. Hence the total area exposed by the slots 158 and 158a is one-half the total area of this stereoscopic negative. The light passes through slots 158 and 158a and then through the negative, which is very close to the mask. The light which has passed through the portions of the negative which are aligned with slots 158 and 158a, is caused to pass through suitable cylinders, so as to record upon the positive film, as shown in Fig. 10, two narrow vertical zones 155 and 155a. The vertical zone 155 is a laterally reduced photograph of that portion of the negative which has been registered with the slot 158, in full height. The vertical zone 155a which has been photographed upon the positive, likewise corresponds to that part of the negative which has been aligned with the slot 158a. This first printing prints one-half the total area of this first stereoscopic negative, on the positive film. The mask is then shifted so as to utilize the slots 159 and 159a, so that the first stereoscopic negative is at the same level as slots 159 and 159a, as though the first stereoscopic negative of Fig. 12 has been moved to the position shown in Fig. 18. The same first stereoscopic negative of Fig. 12 is now subjected to a second exposure, with the use of slots 159 and 159a, and in this second exposure the remaining one-half of the total area of said first stereoscopic negative is exposed, so as to produce laterally reduced vertical zones 155b and 155c, as shown in Fig. 10. The four separated vertical zones which thus correspond to the entire first stereoscopic negative are all recorded upon the same frame of the positive, so that the tops and bottoms of zones 155 and 155a, 155b and 155c, are located on two paralled horizontal lines. Of course when the slots 159 and 159a are utilized, the cylinders which are utilized are shifted or adjusted so as to be properly aligned with said slots 159 and 159a.

Since stereoscopic negatives come in pairs, the next operation is to print the second stereoscopic negative of said first pair, this second stereoscopic negative being shown in Fig. 13.

This is done in a similar sequence of operations. For example, in the first exposure of the second stereoscopic negative of said pair, I use the slots 160 and 160a of the mask, so as to photographically print the reduced vertical zones 156 and 156a, on the same frame or lateral portion of the positive, upon which the vertical zones 155-155c inclusive, have previously been photographed. The second stereoscopic negative is then again photographed, using slots 161 and 161a, and it may be assumed that in the second exposure, the second stereoscopic negative is in the position shown in Fig. 13.

Likewise a third stereoscopic negative, shown in Fig. 14, and belonging to the next pair of stereoscopic frames, can be photographed upon the same frame of the positive film, by recording the zones 157, 157a, 157b and 157c. This stereoscopic negative of the second pair, is shown in two positions in Fig. 14. Fig. 10 therefore shows a monostereoscopic frame of a positive, upon which three stereoscopic negatives have been recorded.

As shown in Fig. 15, if it is desired to make a positive film which can be fed continuously, the zones 155 and 155a and 155b and 155c are located at the same level on the positive film. This can be done by two exposures of the same stereoscopic negative, in the manner previously explained. The positive film is now fed in the direction of its length through the gate of the photographic printing device, through a short distance, which is less than the height of the zone 155. The distance through which the positive film can be thus fed can be extremely small, if desired. The zones 156, 156a, 156b and 156c are now printed upon the positive film, below zones 155-155c inclusive, zones 156-156c inclusive being on the same level. This is shown in Fig. 15.

The positive film is now shifted through the gate to a distance equal to the distance of the first shift, and the four zones 157, 157a, and 157b and 157c are now printed upon the same level, below the zones 156-156c, inclusive, as shown in Fig. 15.

According to the scale used in this illustrative example, the entire width of the positive film is occupied by twelve of these zones.

Hence, as shown in Fig. 15, when the fourth stereoscopic frame is recorded upon the positive film, said forth stereoscopic frame is recorded by means of four zones, and these four zones are located underneath and they are aligned with the four zones 155, 155a, 155b and 155c. One of these four zones is indicated by the reference numeral 158 in Fig. 15.

This process is then continued so as to photograph any desired number of stereoscopic negatives consecutively upon the positive film shown in Fig. 15. Fig. 16 shows how the light can be passed through the slots of mask 170, then through the negative film N, then through cylinders located in an opening of an opaque holder, and how the light is then allowed to fall upon the light-sensitive positive film P.

In projecting a positive film of the type shown in Fig. 15, the light is caused to pass through said positive film, then through a battery of enlarging cylinders, as illustrated at the bottom of Fig. 15, and then through the objective lens system. The enlarging cylinders shown in Fig. 15 can be moved back and forth very slowly and through a short distance along a horizontal line, while the film is being fed continuously in a vertical line, at a suitable slow speed.

The cylinders will simultaneously scan and enlarge and project the spaced sub-pictures 155, 155a, 155b, 155c, which correspond to the stereoscopic negative frame of Fig. 12. The film is moving continuously so that the next set of sub-pictures 156, 156a, 156b, and 156c, enter the gate. While this is being done, the cylinders are shifted to project said sub-pictures 156, 156a, 156b, 156c, etc.

During the projection, the cylinders enlarge the zones, anterior to the objective lens system, so as to produce a continuous positive duplicate of the original negative frame.

In printing the laterally reduced zones on the positive, it is necessary to have cylinders of sufficiently large diameter to pick up the full-sized zones of the stereoscopic negative. For example, the width of the film may be one inch, so that the width of a zone of the negative stereoscopic frame is 0.25 inch. In order to photograph and reduce this zone, the diameter of the cylinder must materially exceed 0.25 inch.

In projecting the reduced zone, it is possible and preferable to laterally enlarge the reduced zone to its original width of 0.25 inch, by using a cylinder located as close as possible to the reduced zone 155, etc. This makes it possible to use cylinders during the projection, of much smaller diameter than the cylinders used to print the zones of the negative on a laterally reduced scale. This is preferable, in order to project a continuous duplicate of the original frame, during the movement of the projecting cylinders.

During the projection of the positive film, the movement of the projecting cylinders may be in synchronism or it need not be in synchronism with the continuous slow movement of the positive film. If synchronism is desired, said cylinders should first project the four zones which correspond to the first stereoscopic frame, and then project the next set of four zones which correspond to the second stereoscopic frame, and so on. As shown in Fig. 15, the width of a reduced zone is less than the distance between two reduced zones in the same lateral row.

If it is desired to make a positive of a non-stereoscopic type which can be run continuously through the projector, the same procedure is followed in copying the consecutive frames of a non-stereoscopic negative, said negative being of the ordinary type which is taken by means of an ordinary camera, using a single lens.

If a positive film of the type which is run continuously and slowly through the projector is being utilized, said film may become overheated by the light source. Therefore, during the projection of the film, I can use a mask of the type shown in Fig. 11, so as to expose to the light, only those zones of the positive film which are to be projected at the particular time. The slits in said projecting mask can correspond in width to the width of the laterally reduced zones on the positive film.

Fig. 17 diagrammatically illustrates how the source of light can be shifted while the cylinders are scanning the continuously moving film of the type which is shown in Fig. 15. In Fig. 17 it is assumed that the film is being fed downwardly and in a direction perpendicular to the plane of the paper and the arrow indicates the scanning movement of the cylinders in one direction. The cylinders will be moved back and forth along the direction line which is indicated by said arrow.

In this embodiment the direction of the light which is transmitted through the film is also changed, so that the effect is the same as though the source of light were moved to and fro along a horizontal line, the light being moved in the same direction as the cylinders. That is, when the cylinders are being moved towards the head of the arrow indicated in Fig. 17, the source of light is moved in the same direction. The zones indicated in Fig. 15 may be so narrow as to produce an effect similar to the pinhole effect, so that the light falls upon the scanning cylinder, along a direction line which is drawn between the source of light and the central point of the zone.

That is, Fig. 15 shows that a negative frame is represented by the four zones 155, 155a, 155b, and 155c, and these zones are narrow and the space between each pair of said zones greatly exceeds the width of each of said zones.

In Fig. 15 the spaces between the zones 155, 155a, 155b and 155c are substantially transparent, because said spaces have not been exposed.

Referring to Fig. 17, the source of light is in the position indicated by the reference numeral 155L, when the scanning cylinder is in the position indicated by 155L'.

Fig. 17 shows the direction of the light from the source 155L to the central line of the zone 155b. The cylinder in the position 155L' forms in effect, an image of the zone 155b along the zone which is indicated by the heavy black line of the cylinder in the position 155L'.

As the cylinder moves from the position indicated by 155L' to the position indicated by 156L', the source of light is moved from the position 155L to the position shown in 156L. The result is to form, in effect, an image of the zone 156b corresponding to the portion of the cylinder in the position 156L', which is indicated by the heavy black line.

The same result follows when the source of light is moved to the position 157L and the scanning cylinder has been moved to the position 157L'.

The effect is to maintain the image in the same position relative to the objective lens system which is indicated by the reference letter O in Fig. 17. The image in effect turns about a fixed central point which is on the optical axis of the objective lens system O.

Hence as consecutive corresponding zones are scanned, they will be projected upon the same part on the motion picture screen. For example, the zones 155 and 156 and 157 will each be projected upon the same portion of the screen. Likewise the zones 155a, 156a, and 157a, will be consecutively projected upon the same part on the motion picture screen, this part being different from the part which receives the projections of the zones 155, 156 and 157.

Hence the picture which is projected upon the motion picture screen will not be shifted upon said screen thus eliminating disagreeable flickering and the like.

Whenever I refer to the use of a cylinder, I include, as an equivalent, a segment of a cylinder, or a thick lens of any type, in which the thickness of the lens is sufficient to determine the nature of the refraction, and to determine the area of the picture which is being scanned.

That is, the ordinary lens is so thin, and it is so free from spherical aberration, so that the area of the picture which is being scanned, is substantially equal to the entire area of the lens.

According to my method, I scan separated parts of the frame or picture, without the use of slitted screens which would provide sharply defined lights and shadows, and cylindrical lenses are only one of the numerous refracting or reflecting means which would accomplish this purpose.

I claim:

1. A method of producing stereoscopic projection of motion pictures with the use of a single film which is moved intermittently in a predetermined longitudinal direction so as to successively and intermittently project successive frames of said film, which consists in photographically printing in each frame at least two series of sub-pictures in a row which is lateral to said direction by separating continuous negatives respectively into spaced sub-pictures of less width than said negative, the respective sub-pictures of each series being spaced laterally from each other, each sub-picture of one series being followed by a sub-picture of the other series, with the exception of the end sub-picture of said series, said two series corresponding respectively to respective pictures of the same moving object in the same position and taken from different angles independently of the movement of said object relative to the means for taking said pictures, and laterally scanning and enlarging each series of sub-pictures in each frame while the film is stationary so as to project the respective series successively in the form of continuous projected pictures, said lateral scanning being sufficiently rapid to give the effect of persistence of vision.

2. In the art of producing stereoscopic projection of motion picture films with the use of a single film which is moved intermittently in a predetermined longitudinal direction so as to successively and intermittently project successive frames of said film, which consists in photographically printing in each frame at least one pair of pictures of a moving object in the same position and taken at different angles independently of the movement of said object relative to the means of taking said pictures, by printing negatives while reducing their width, said pair of pictures being located in a lateral row, and projecting said pictures successively by lateral scanning while the film is at rest, said successive scanning and projection being sufficiently rapid to give the effect of persistence of vision.

JACOB Z. DENINSON.